(12) United States Patent
Asai et al.

(10) Patent No.: US 7,718,289 B2
(45) Date of Patent: May 18, 2010

(54) FUEL CELL SYSTEM AND RELATED METHOD

(75) Inventors: Akihiro Asai, Yokosuka (JP); Toshiya Oosawa, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 988 days.

(21) Appl. No.: 10/469,545

(22) PCT Filed: Dec. 24, 2002

(86) PCT No.: PCT/JP02/13438

§ 371 (c)(1), (2), (4) Date: Sep. 10, 2003

(87) PCT Pub. No.: WO03/058740

PCT Pub. Date: Jul. 17, 2003

(65) Prior Publication Data

US 2004/0115495 A1    Jun. 17, 2004

(30) Foreign Application Priority Data

Jan. 8, 2002 (JP) .............................. 2002-001570

(51) Int. Cl.
H01M 8/04 (2006.01)
(52) U.S. Cl. ............................ 429/24; 429/19; 429/22
(58) Field of Classification Search ........................ None
See application file for complete search history.

(56) References Cited

U.S. PATENT DOCUMENTS

| 5,658,681 | A | * | 8/1997 | Sato et al. ....................... 429/13 |
| 5,667,566 | A | * | 9/1997 | Flynn et al. .................. 96/117.5 |
| 5,769,626 | A | * | 6/1998 | Hauff et al. .................... 432/72 |
| 5,798,186 | A |   | 8/1998 | Fletcher et al. |
| 6,027,546 | A | * | 2/2000 | Kusters et al. .................. 95/52 |
| 6,329,089 | B1|   | 12/2001| Roberts et al. |
| 6,635,371 | B2| * | 10/2003| Kawasumi et al. ............. 429/17 |
| 6,645,653 | B2| * | 11/2003| Kashiwagi ..................... 429/22 |
| 7,122,259 | B2| * | 10/2006| Takahashi ...................... 429/13 |
| 2001/0014415 | A1 | * | 8/2001 | Iio et al. ........................ 429/22 |
| 2001/0028967 | A1 | * | 10/2001| Roberts et al. ................. 429/13 |

(Continued)

FOREIGN PATENT DOCUMENTS

EP    1 018 774 A1    7/2000

(Continued)

*Primary Examiner*—Patrick Ryan
*Assistant Examiner*—Tony Chuo
(74) *Attorney, Agent, or Firm*—Foley & Lardner LLP

(57) ABSTRACT

A fuel cell system (S) is provided with a fuel cell body (12), an air supply system (1, 2, 3, 4) supplying air to the fuel cell body, an air flow rate control system (5, 6, 7, 8, 9, 10, 13, 14) varying opening degrees of flow paths, through which air is supplied, to control flow rates of air, and a droplet removal structure (3, 8, 9, 10, 13, 14, 19, 20, 21, 22, 23, 24) removing droplets adhered to the air flow rate control system. The droplet removal structure is operative to set the opening degree of the air flow rate control system to have a droplet removal opening degree to increase a speed with which the air flows and allows the air to flow at the droplet removal opening degree for blowing off the droplets adhered to the air flow rate control systems.

20 Claims, 8 Drawing Sheets

U.S. PATENT DOCUMENTS

| | | | |
|---|---|---|---|
| 2001/0051290 A1* | 12/2001 | Kashiwagi | 429/13 |
| 2001/0055707 A1* | 12/2001 | Roberts et al. | 429/30 |
| 2002/0001741 A1* | 1/2002 | Kawasumi et al. | 429/20 |
| 2002/0009623 A1* | 1/2002 | St-Pierre et al. | 429/13 |
| 2002/0119357 A1 | 8/2002 | Baldauf et al. | |

FOREIGN PATENT DOCUMENTS

| | | | |
|---|---|---|---|
| JP | 56-037673 A | | 4/1981 |
| JP | 11-273704 | * | 10/1999 |
| JP | 2000-12060 A | | 1/2000 |
| JP | 2000-512068 A | | 9/2000 |
| JP | 2000-315515 A | | 11/2000 |
| JP | 2001-185179 A | | 7/2001 |
| JP | 2001-332281 A | | 11/2001 |
| JP | 2002-208429 A | | 7/2002 |
| JP | 2002-246054 A | | 8/2002 |
| JP | 2002-313395 A | | 10/2002 |
| JP | 2003-187846 A | | 7/2003 |
| WO | WO 00/65676 A1 | | 11/2000 |
| WO | WO 01/03212 A2 | | 1/2001 |

* cited by examiner

FUEL CELL SYSTEM AND RELATED METHOD

TECHNICAL FIELD

The present invention relates to a fuel cell system and a related method and, more particularly, to a fuel cell system, which prevents dew from being condensed in air supply paths and its related method.

BACKGROUND ART

When an operation of a fuel cell system is stopped in a low temperature atmosphere, it is conceived that condensed dew in the fuel cell system is apt to freeze to provide an affect to a restart of the fuel cell system.

If the fuel cell system is left under such a stoppage condition in the low temperature atmosphere below 0° C., it is conceivable that an air flow rate control system of the fuel cell system tends to freeze due to moisture contained in air with a resultant situation which requires such frozen ice to be melted and thawed at the restart of the fuel cell system for rendering the air flow rate control system to be operative.

Japanese Patent Application Laid-Open Publication No. 2000-12060 proposes a structure in which a compressor, serving as a source of air supply, is operated at a compression ratio higher than the highest efficiency point to permit high temperature air to be produced, due to adiabatic compression, by which the temperature of its system is increased to thaw such frozen ice.

DISCLOSURE OF INVENTION

However, with the fuel cell system employing such a structure to increase the temperature of the system using the high temperature air supplied from the air supply source to thaw the ice in the air flow rate control system, it takes a remarkable time before the ice is melted, resulting in a tendency of an increase in a time period for the restart of the system.

Further, since the air flow rate control system is so configured to be kept in a fully closed condition during a stoppage of a normal electric power generating operation in the fuel cell system, if the system is frozen together with the ice sticking thereto, the air supplied from the air supply source is hard to be easily delivered to component elements of the system disposed downstream of the air flow rate control system, tending to further increase the restart time of the system.

Furthermore, although it is conceivable to adopt another structure that uses a heater or an electric heater to melt the ice, such a structure results in a complicated configuration in the fuel cell system and, in addition, may need to use energy from an auxiliary energy source such as a battery.

The present invention has been completed upon such studies conducted by the present inventors in the manner set forth above and has an object to provide a fuel cell system and a related method which prevent freezing and sticking of air flow paths of an air flow rate control system or the like, to provide a shortened start-up time.

To achieve the above object, according to a first aspect of the invention, a fuel cell system comprises: a fuel cell body; an air supply system supplying air to the fuel cell body; an air flow rate control system controlling a flow rate of the air, while varying an opening degree of a flow path through which the air is supplied to; and a droplet removal structure removing droplets adhered to the air flow rate control system. Here, the droplet removal structure is operative to set the opening degree of the air flow rate control system at a droplet removal opening degree to increase a speed with which the air flows, when a given condition is established at a stop of or after the stop of the fuel cell system, to allow the air to flow at the droplet removal opening degree to cause the droplets adhered to the air flow rate control system to be blown off.

Stated another way, a fuel cell system comprises: a fuel cell body; air supply means for supplying air to the fuel cell body; air flow rate control means for controlling a flow rate of the air, while varying an opening degree of a flow path through which the air is supplied; and droplet removal means for removing droplets adhered to the air flow rate control means. And the droplet removal means is operative to set the opening degree of the air flow rate control means at a droplet removal opening degree to increase a speed with which the air flows, when a given condition is established at a stop of or after the stop of the fuel cell system, to allow the air to flow at the droplet removal opening degree to cause the droplets adhered to the air flow rate control means to be blown off.

On the other hand, there is provided a method of removing droplets in a fuel cell system, which is provided with a fuel cell body, an air supply system supplying air to the fuel cell body and an air flow rate control system controlling a flow rate of the air while varying an opening degree of a flow path through which the air is supplied. The method of removing the droplets in the fuel cell system comprises: discriminating whether a given condition is established at a stop of or after the stop of the fuel cell system; setting the opening degree of the air flow rate control system to have a droplet removal opening degree to increase a speed with which the air flows; and allowing the air to flow at the droplet removal opening degree to cause the droplets adhered to the air flow rate control system to be removed.

Other and further features, advantages, and benefits of the present invention will become more apparent from the following description taken in conjunction with the following drawings.

BEST MODE FOR CARRYING OUT THE INVENTION

Each of embodiments of the present invention is described in detail hereinafter with suitable reference to the accompanying drawings.

First Embodiment

First, referring to FIGS. 1 to 9, a first embodiment of the present invention is described more in detail.

Figure 1:
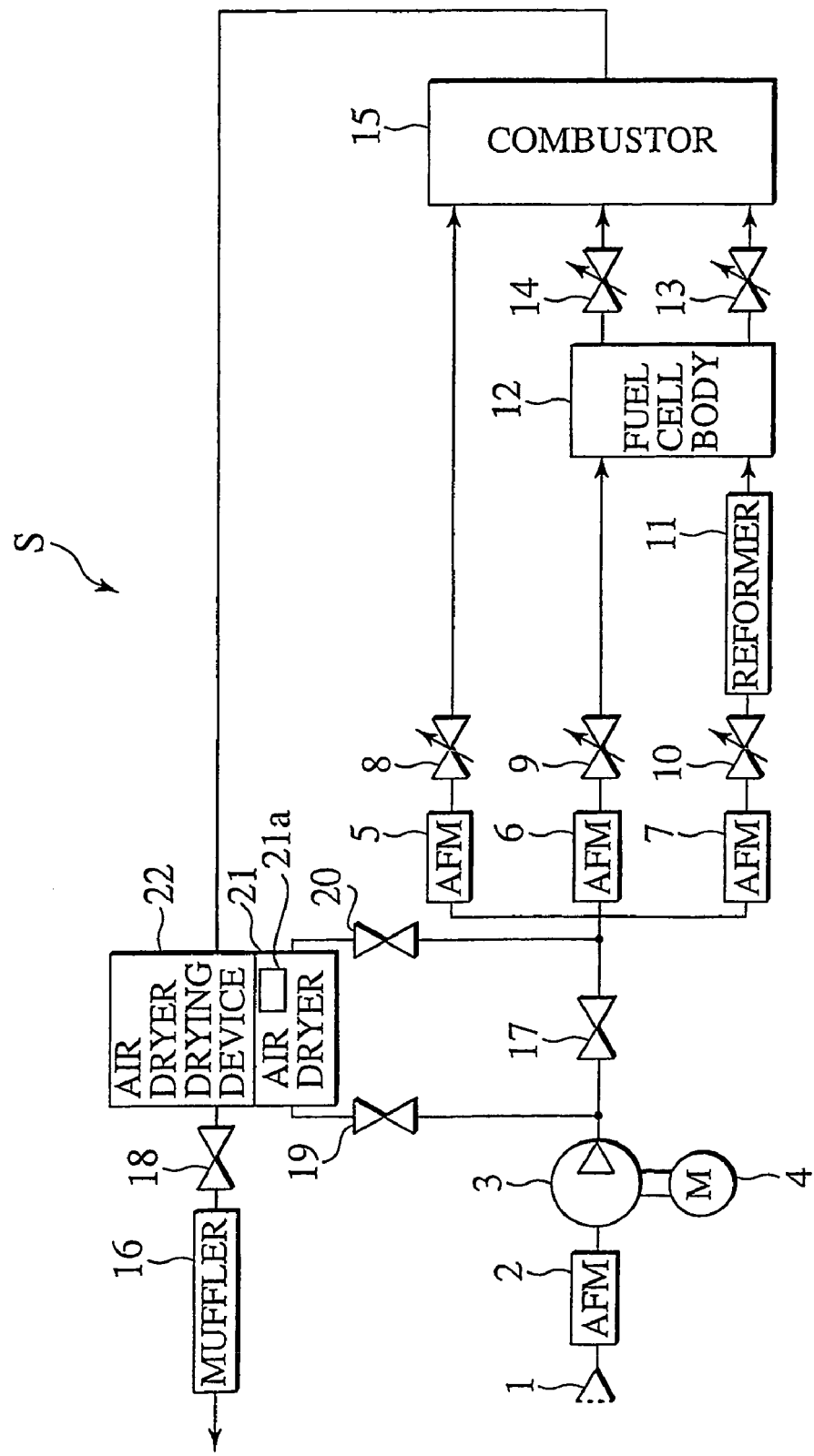
FIG. 1 is a system structural view of a fuel cell system of a first embodiment according to the present invention.

FIG. 1 is an overall structural view of a fuel cell system of the presently filed embodiment.

In FIG. 1, the fuel cell system S is shown including an air filter 1 that filters air, an air flow meter 2 that detects the flow rate of air passing therethrough, a compressor 3 that serves as a source of air supply for compressing and supplying filtered air to various parts of the fuel cell system, a drive motor 4 that drives the compressor 3, air flow meters 5, 6, 7 that detect the flow rates of air passing therethrough, flow control valves 8, 9, 10, a reformer 11 that serves as a reforming mechanism for permitting feed fuel, which is supplied from a source of fuel supply which is not shown, to be reformed and reacted under the presence of a reforming catalyst to form reformed gas in a hydrogen rich state, a fuel cell body 12 that serves as an electric power generating mechanism for generating electric power output based on reformed gas delivered from the reformer 11 and air supplied from the compressor 3, pressure control valves 13, 14 that serves as pressure control mechanisms, respectively, a combustor 15 serving as a combustion mechanism that allows exhaust gases, emitted from the fuel cell body 12, to be combusted in the presence of air supplied from the compressor 3, a muffler 16 that eliminates the level of exhaust noises produced by the combustor 15, and flow direction control valves 17, 18, 19, 20.

Here, in FIG. 1, the air filter 1, the air flow meter 2, the compressor 3 and the drive motor 4 form an air supply system. Also, the compressor 3 serves as a droplet removal air supply mechanism with no need for a separate other droplet removal air supply mechanism.

Further, a combination between the air flow meter 5 and the flow control valve 8, a combination between the air flow meter 6 and the flow control valve 9 and a combination between the air flow meter 7 and the flow control valve 10 form air flow rate control systems, respectively. Furthermore, it is conceivable that the respective airflow rate control systems entirely form one airflow rate control system in a mutually correlated relation.

Moreover, the flow direction control valves 19, 20, the air dryer 21 that absorbs moisture from air for the removal of the droplets and an air dryer drying unit 22 for heating the air dryer 21 using waste heat of the combustor 15 to allow the air dryer 21 to be reproduced from a moisture absorbing mechanism. Heating the air dryer 21 using the waste heat of the combustor 15 allows running costs to be lowered. Further, since such a moisture absorbing mechanism is located in a path where there is no airflow during normal operating condition, no adverse affect is imparted to pressure losses during the normal operating condition.

Here, with the air supply system, the flow rate of air filtered with the air filter 1 is detected with the air flow meter 2, with the compressor drive motor 4 being controlled to permit the discharge rate of the compressor 3 to be regulated at a desired flow rate in accordance with the detected flow rate of air.

Further, the air flow rate control systems are disposed in flow paths of the reformer 11, the fuel cell body 12 and the combustor 15, respectively, and with the air flow rate control systems, opening degrees of the flow control valves 8, 9, 10 are altered to allow desired downstream flow rates to be obtained in dependence on the flow rates detected with the air flow meters 5, 6, 7, respectively, for thereby controlling the flow rates of air to be supplied to the reformer 11, the fuel cell body 12 and the combustor 15, respectively.

Furthermore, the reformer 11 performs reforming reaction under the presence of the catalyst, using hydrocarbon fuel, such as methanol or gasoline delivered from a feed fuel tank which is not shown, water delivered from a water tank which is not shown, and air supplied from the compressor 3, thereby producing mixed gas of $H_2$ and CO. Also, the presence of CO causes a platinum electrode of the fuel cell body 12 to be poisoned to degrade a performance of the fuel cell body 12 and, for this reason, the reformer 11 is equipped with a device that causes selective oxidizing reaction to take place to remove CO from the mixed gas to form reformed gas in the hydrogen rich state.

Moreover, with the fuel cell body 12, reformed gas produced with the reformer 11 is supplied to a fuel electrode which is not shown and air delivered from the compressor 3 is supplied to an air electrode which is not shown, with the electric power output being generated due to electrochemical reaction between hydrogen in the reformed gas and oxygen in the air.

Also, the pressure control valves 13, 14 serve as a kind of air flow rate control systems that execute control of a pressure balance between the fuel electrode and the air electrode of the fuel cell body 12, with a resultant control in the flow rates of air.

In addition, these air flow rate control systems have series connected relationships with the air flow rate control systems formed in combination between the air flow meter 6 and the flow rate control valve 9 and the air flow rate control system formed in combination between the air flow meter 7 and the flow rate control valve 10, respectively.

Further, the combustor 15 permits reformed gas, exhausted from the fuel cell body 12 after reaction, and air to be reacted with one another under the presence of a catalyst, to cause the exhaust gases to be converted to substances such as steam to be expelled to an atmosphere.

Furthermore, the flow direction control valve 17 is opened during the normal operating condition, and also during such time interval, the flow direction control valves 19, 20 remain in closed conditions.

Now, operation of the fuel cell system of the embodiment with the structure set forth above is described below.

Figure 2:
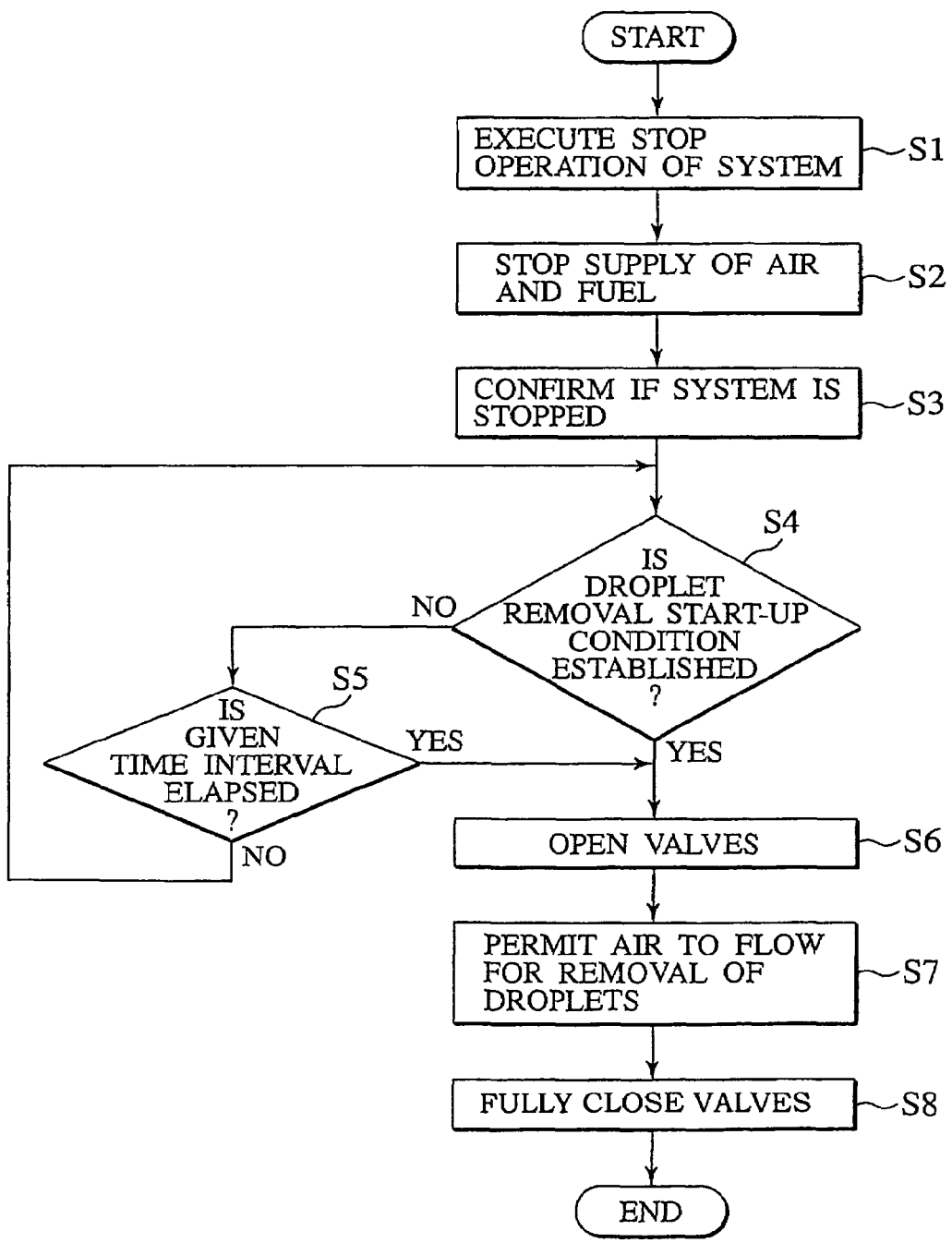
FIG. 2 is a flowchart illustrating the basic sequence of operations of the fuel cell system shown in FIG. 1 in accordance with the first embodiment.

FIG. 2 is a flowchart illustrating the basic sequence of operations of the fuel cell system of the presently filed embodiment. Also, such operations are executed with a controller which is not shown.

In FIG. 2, first, in step S1, a sequence for stopping electric power generation is initiated in response to an input such as an electric power generation stop signal and in subsequent step S2, supply of air to the reformer 11, the fuel cell body 12 and the combustor 15 is interrupted. More particularly, in step S2, in order to stop reactions of the reformer 11, the fuel cell body 12 and the combustor 15 accompanied with interrupted reaction of the fuel cell system, the flow direction control valves 17, 18, the flow control valves 8, 9, 10 of the air flow rate control mechanism and the pressure control valves 13, 14 are closed, respectively.

In consecutive step S3, confirmation is made as to whether the reactions of the reformer 11, the fuel cell body 12 and the combustor 15 are interrupted, respectively.

In next step S4, judgment is made to find if a droplet removal start-up condition is established. The droplet removal start-up condition is a judgment condition to discriminate whether to execute removal of the droplets.

Here, it is conceived that the droplet removal start-up condition in step S4 are classified into various conditions involving first to fourth droplet removal start-up conditions which are described below in sequence.

The first droplet removal start-up condition needs a detector, which is not shown, for detecting the atmospheric temperature of the atmospheric air outside the fuel cell body 12, with a required condition in that the atmospheric temperature of the fuel cell system, detected with the such a detector to avoid freezing, falls into or below the freezing point (equal to or below 0° C.). That is, according to the first droplet removal start-up condition, droplet removal operation is executed when it is confirmed that the atmospheric temperature of the fuel cell system is equal to or below 0° C. Also, under such a situation, it is preferred that presetting a start-up delay time to some extent with a feasible prospect of dew condensation that would occur in the fuel cell system allows the droplet removal to be implemented when the start-up delay time is elapsed further from a time instant, after judgment is made in step S4 to find out that the first droplet removal start-up condition is established, to cause the dew condensation to substantially occur in the fuel cell system. Further, it may be possible to preset such a start-up delay time referring to the atmospheric temperature of the fuel cell system such that the lower the atmospheric temperature, the shorter will be the start-up delay time interval. With such a structure, the frequency of undesired droplet removal operations can be eliminated with a resultant reduction in the amount of energy consumed for removing the droplets.

Next, the second droplet removal start-up condition needs the provision of a detector, which is not shown, for more directly detecting the humidity in the fuel cell system, with a required condition in that the fuel cell system has the humidity of 100% when detected with such a detector. That is, according to the second droplet removal start-up condition, the droplet removal is executed when it is confirmed that the fuel cell system reaches the humidity of 100%. Also, under such a situation, it is preferred that similarly presetting a start-up delay time to some extent allows the droplet removal to be implemented when the start-up delay time is elapsed further from a time instant, after judgment is made to find out that the humidity in the fuel cell system reaches a value of 100%, to cause the dew condensation to substantially occur in the fuel cell system. Further, it may be possible to suitably preset such a start-up delay time referring to the atmospheric temperature of the fuel cell system. Also, the droplet removal may be executed when both the first and second droplet removal start-up conditions are satisfied.

Further, the following factors are listed as the third droplet removal start-up condition.

Figure 3:
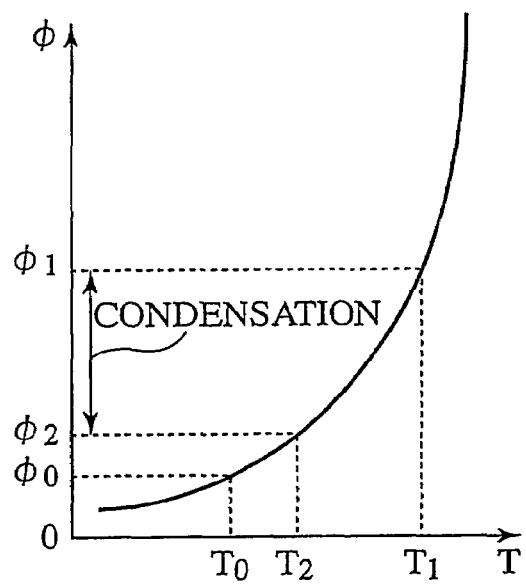
FIG. 3 is a graphical representation of a relationship between a temperature T and an amount $\phi$ of saturated steam in air of the fuel cell system of the first embodiment.

FIG. 3 is a typical representation of the relationship between the temperature T and the amount $\phi$ of saturated steam contained in air.

In FIG. 3, the fuel cell system is required to have the detector, which is not shown, for detecting temperatures as represented by temperatures $T_1$, $T_2$ inside the fuel cell system ($T_1$ and $T_2$ are detected at the same detection point in the fuel cell system and related such that $T_1$ is higher than $T_2$: $T_1 > T_2$) and the atmospheric temperature, of the fuel cell system, as represented by a temperature $T_0$ ($T_2$ is higher than $T_0$: $T_2 > T_0$), and if the amount of steam is saturated at the temperature $T_1$, then the amount of saturated steam is expressed as $\phi_1$. Thus, as the temperature is lowered from the temperature $T_1$, dew condensation occurs. In particular, since the fuel cell system is maintained in a stopped state under a surrounding temperature $T_0$, the temperature in the fuel cell system is lowered from $T_1$ to $T_0$. For this reason, even when droplet removal is executed at the temperature $T_1$ at which the amount of saturated steam lies at $\phi_1$, dew condensation promptly occurs again.

Accordingly, under the first droplet removal start-up condition set forth above, although it is structured that the droplet removal is executed at the atmospheric temperature equal to or below 0° C. and, more preferably, if the start-up delay time is elapsed after the fuel cell system is brought into the stopped state, whereas under the third droplet removal start-up condition, the droplet removal is executed when the temperature in the fuel cell system remains at a value as close as possible to the atmospheric temperature $T_0$ to reach a given temperature value $T_2$. That is, if it is confirmed that the temperature in the fuel cell system becomes closer to the atmospheric temperature $T_0$ and reaches the given temperature $T_2$, then the droplet removal is executed.

In such a situation, idealistically, executing the droplet removal at a timing when the temperature inside the fuel cell system reaches the atmospheric temperature $T_0$, that is, $T_2 = T_0$, enables the droplets, which occurs due to the dew condensation, to be entirely removed and, thereafter, if there is no variation in the atmospheric temperature $T_0$, there is no probability for the dew condensation to occur in the fuel cell system. However, in actual practice, it takes quite a long time before the temperature inside the fuel cell system further approaches the value $T_0$ and is finally saturated. For this reason, determining the given temperature value $T_2$ in correspondence with a given value (a given ratio) of a difference between $T_2$ and $T_1$ against a difference between $T_0$ and $T_1$, (e.g., a given ratio of 70% obtained by dividing the difference between $T_2$ and $T_1$ by the difference between $T_0$ and $T_1$), it is possible to remove a major portion of the dew condensation, without a need for a long time, which would occur when the temperature of the fuel cell system is lowered to the value $T_0$. Also, of course, such a given value is not limited to 70% and may take any other values that are suitably determined as design values in consideration of various conditions.

Here, in a case where the atmospheric temperature $T_0$ is equal to or below the freezing point (equal to or below 0° C.) and resultantly, the given temperature value $T_2$ is equal to or below the freezing point (equal to or below 0° C.), since there is a probability in that the freezing occurs before removal of the droplets, the droplet removal may be preferably executed directly before the temperature assumes the value 0° C. without waiting until the temperature in the fuel cell system reaches the value $T_2$.

Further, as the fourth droplet removal condition, the given temperature value $T_2$ in the third droplet removal start-up condition set forth above is obtained in the following manner.

The fourth droplet removal start-up condition is provided for enabling drives of the valves, such as the flow control valves 8, 9, 10, 13, 14 of the fuel cell system, even in a case where these valves are frozen when after, e.g., a few days later subsequent to the stopped condition of the fuel cell system, the atmospheric temperature decreases to be equal to or below the freezing point, and since the meaning of $T_2$ is slightly different from the content discussed above, $T_2$ is described below as $T_2'$.

First, supposing that the fuel cell system is started up next time, attempts are preliminarily made to experimentally obtain the amount $\phi_2$ of dew condensation (the amount of moisture) by which should the valves are frozen, the frozen condition with such an amount of moisture is removed using only the drive powers of the valves. Subsequently, attempts are made to obtain the temperature, as a given temperature $T_2'$, which causes the amount of dew condensation to reach the value $\phi_2$ when in the humidity of 100% (at the saturated condition of the steam), the temperature is lowered from a given value to 0° C. Executing droplet removal at a timing when the temperature reaches such a value $T_2'$ enables the fuel cell system to be reliably started up next time while promptly completing the droplet removal, providing a capability of causing the current operation of the fuel cell system to be rapidly terminated.

Here, in a case where the valves, forming main objects for removal of the droplets, are disposed in upstream areas of the reactors, such as the reformer 11, the fuel cell body 12 and the combustor 15, that is, the valves include the flow control valves 8, 9, 10, the amount of moisture contained in air to be introduced into the fuel cell system is equal to that of the atmospheric air outside the fuel cell system. Under such a situation, the atmospheric temperature and the atmospheric humidity of the atmospheric air of the fuel cell system are measured during the stopped condition of the fuel cell system while calculating the amount of moisture appearing when the atmospheric temperature of the atmospheric air introduced into the fuel cell system reaches the temperature $T_2'$. And, the droplet removal is not executed unless such obtained amount of moisture becomes equal to or greater than the amount of moisture (resulting in the amount of dew condensation) at the temperature $T_2'$ in the presence of the humidity of 100%.

In such a case, since the amount of moisture due to the dew condensation is less than the amount $\phi_2$ of moisture that is effective for the frozen state to be removed using only the drive powers for the valves of the air flow rate control system, it is possible to make such a judgment in that the droplet removal may not be executed, without waiting the situation in which the temperature is lowered to $T_2'$, i.e., directly after the stopping operation of the fuel cell system. That is, this results in a capability of effectively precluding the droplet removal from being executed in the absence of requirement for the droplet removal.

Further, in another case where the valves, such as the pressure control valves 13, 14 that form major objects for removal of the droplets, are disposed in downstream areas of the reactors, measuring the temperature and the humidity in the fuel cell system during the stopped condition of the fuel cell system enables the humidity, appearing when the temperature within the system reaches the temperature $T_2'$, to be calculated. In this instance, if the moisture during the temperature $T_2'$ does not reach the value of 100%, there is no probability for the amount of dew condensation to have a value which renders it impossible to remove the frozen condition of the valve, with execution of the droplet removal being avoided.

This results in a capability of preventing execution of the droplet removal in the absence of requirement for removal of the droplets. In an exemplary case where the temperature in the fuel cell system is 80° C. and the humidity in the system has a low value of 10% whereas $T_2'$ is given as 20° C., since it is conceivable that there is no probability of the humidity becoming 100% at the temperature $T_2'$ of 20° C., there is no operation for executing the droplet removal in such a situation.

And, if discrimination is made that at least one of the first to fourth droplet removal start-up conditions set forth above is satisfied, it is presumed that the droplet removal start-up condition in step S4 is established. Subsequently, operation proceeds to succeeding steps after step S6.

On the contrary, in step S4, if either one of the first to fourth droplet removal start-up conditions is not established, then in step S5, judgment is made as to whether a given time interval is elapsed from the stop of the fuel cell system. If the given time interval is not elapsed, operation returns to step S4. In contrast, in step S5, if judgment is made that the given time interval is elapsed, operation proceeds to steps subsequent to step S6.

Here, the operation subsequent to step S6 include a step of implementing air blow using air with least possible moisture via the moisture absorbing mechanism and compelling conduits of the fuel cell system to be charged with air with least moisture content to reduce the amount of moisture that would cause the dew condensation to occur when the atmospheric temperature is lowered.

Particularly, in step S6, the flow control valves 8, 9, 10 and the pressure control valves 13, 14 of the air flow rate control system are opened at suitable degrees for removal of the droplets (droplet removal opening degrees), respectively.

In succeeding step S7, dry air, whose droplets are removed, is admitted into the fuel cell system to cause the droplets adhered to the air flow rate control system to be removed.

In particular, it is conceived that a method of permitting air to flow for removal of the droplet in steps S6 and S7 includes a step of permitting air to flow in a sequential direction of the fuel cell system using the compressor 3 as shown in FIG. 1. In consideration of a fact that as flowing air is more dried, there is less probability of re-occurrence of the dew condensation when the atmospheric temperature drops further, air is used after passing through the moisture absorbing mechanism and the combustor 15 to be dried.

More particularly, in a case where air is admitted using the compressor 3, the direction control valves 19, 20 and the air dryer 21 of the moisture absorbing mechanism are disposed in downstream areas of the compressor 3 as shown in FIG. 1 such that during flow of air for removal of the droplets, the direction control valve 17 is closed while the direction control valves 19 and 20 are opened to permit air, which is passed through the air dryer 21 and dried, to be admitted to the fuel cell system.

Here, in a case where a regenerative hydroscopic material 21a, such as silica gel, is disposed in a path of the moisture absorbing mechanism such as the air dryer 21, high temperature exhaust gases are introduced from the combustor 15 to the air dryer drying device 22 during start-up of the fuel cell system to cause the air dryer 21 to be heated such that the moisture adhered to the air dryer 21 is discharged to enable the hydroscopic material of the air dryer 21 to be regenerated.

Figure 4:
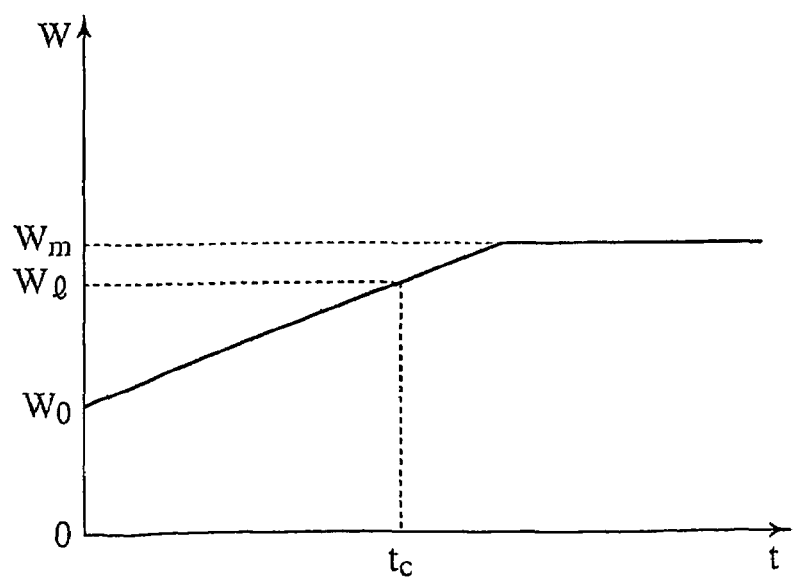
FIG. 4 is a graphical representation of a change with time of a weight of a hygroscopic material, with a relationship between a timing tc at which the hygroscopic material is to be replaced and its corresponding weight $W_1$, in the fuel cell system of the first embodiment.

On the other hand, in a case where a hygroscopic material 21a, such as quicklime (calcium oxide), is used that can not discharge moisture due to heating, there is a need for a detector that detects a weight of the air dryer 21 and, in such a case, an informing device may be provided to inform the need of replacement of the hygroscopic material at a time instant tc at which a weight $W_1$ which is lighter than a weight $W_m$, in which the hygroscopic material is saturated, by a given amount as shown in FIG. 4 to enable the replacement timing to be easily understood. Also, in the figure, $W_0$ designates a dried weight of the hygroscopic material.

Further, various techniques may be conceived for controlling the air flow rate control system during removal of the droplets.

While the fuel cell system includes a plurality of air flow rate control systems, if these flow rate control systems are disposed in series, it is preferable for removal of the droplets to be executed by compelling such flow rate control systems to have the droplet removal opening degrees corresponding to opening degrees mostly effective for removing the droplets, in sequence in which the air flow rate control systems are disposed closer to the droplet removal air supply mechanism, upon consideration of nozzle effects of the valve bodies to enable to increase the flow speeds of airs passing therethrough, contact surface areas of the valve bodies to accelerate to melt ices attached thereto, or the like.

Figure 5A:
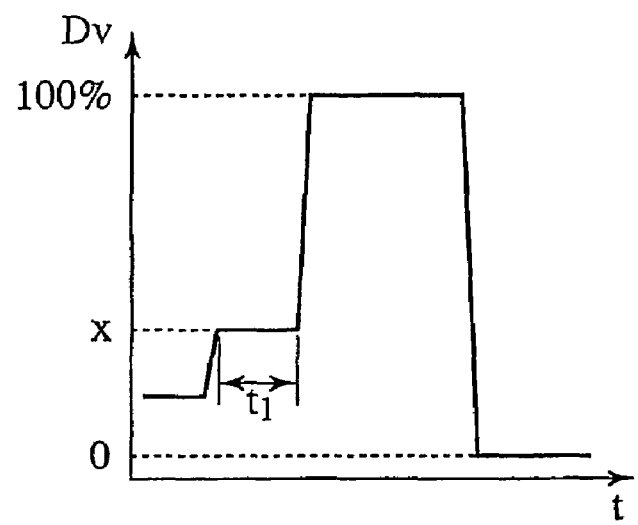
FIGS. 5A and 5B show timing charts to execute operations for removing droplets in a case where air flow rate control systems are disposed in series, in the fuel cell system of the first embodiment.
Figure 5B:
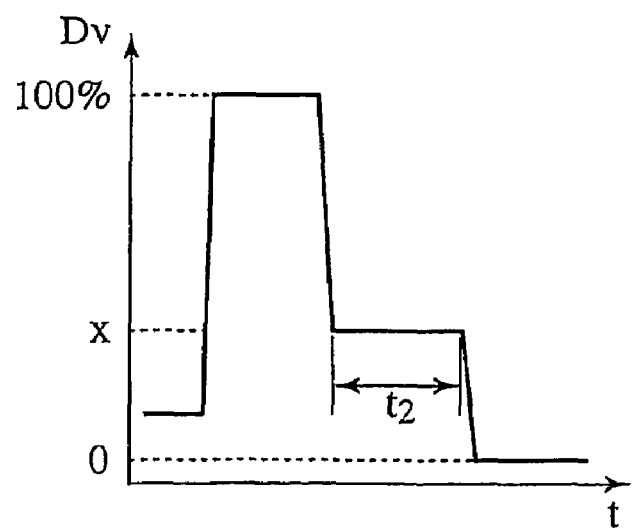

With a case of the structure shown in FIG. 1, since the flow rate control valve 9 and the pressure control valve 14 are disposed in series and the flow control valve 10 and the pressure control valve 13 are disposed in series, respectively, the droplet removal is executed by compelling the valve openings to have the droplet removal opening degree X in sequence in which the component elements of the air flow rate control systems are closer to the compressor 3 serving as the droplet removal air supply mechanism. When this takes place, the other valve, which is disposed in series with the valve that performs the droplet removals, is fully opened at a value 100%. In particular, description is made below with reference to time charts shown in FIGS. 5A and 5B, respectively, in conjunction with an exemplary case of the flow control valve 9 and the pressure control valve 14. First, as shown in FIG. 5A, the valve opening degree $D_v$ of the flow control valve 9, which remains closer to the compressor 3, is selected to have the droplet removal opening degree X for a time interval $t_1$ and, thereafter, the flow control valve 9 is fully opened. On the other hand, as shown in FIG. 5B, the pressure control valve 14, which is remotest from the compressor 3, is operated to fully open during a time interval in which the valve opening degree $D_v$ of the flow control valve 9 is opened to have the droplet removal opening degree X and, thereafter, opened to have the droplet removal opening degree X for a time interval $t_2$ in which the valve opening degree $D_v$ of the flow control valve 9 is fully opened. Conversely saying, a situation arises in which the valve opening degree $D_v$ of the flow control valve 9 is fully opened during the time interval in which the pressure control valve 14 has the opening degree equal to the droplet removal opening degree X. Also, such time intervals $t_1$ and $t_2$ are determined such that the time interval $t_2$, during which the pressure control valve 14 disposed in the downstream side is opened at the droplet removal opening degree X, is longer than the time interval $t_1$ during which the flow control valve 9 in the upstream side is opened at the droplet removal opening degree X. This is based on a consideration in that the pressure control valve 14 is disposed remoter from the compressor 3, serving as the droplet removal air supply mechanism, than the flow control valve 9.

Figure 6A:
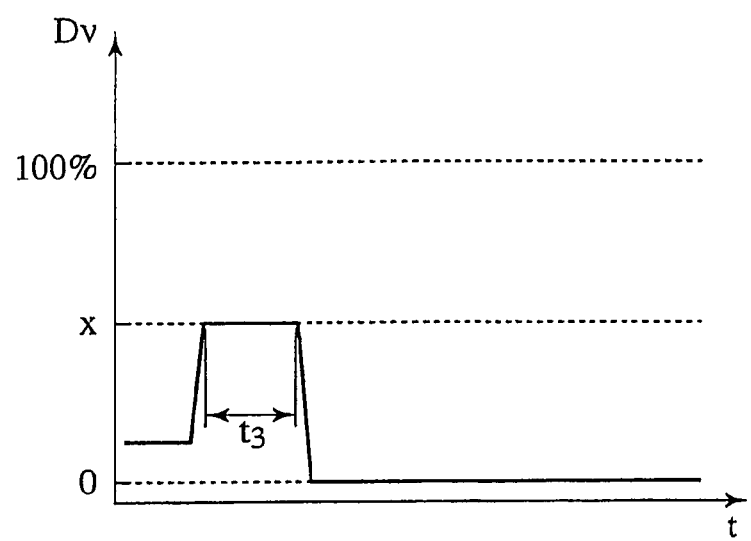
FIGS. 6A to 6C show timing charts to execute operations for removing the droplets in a case where air flow rate control systems are disposed in parallel to on another in the fuel cell system of the first embodiment.
Figure 6B:
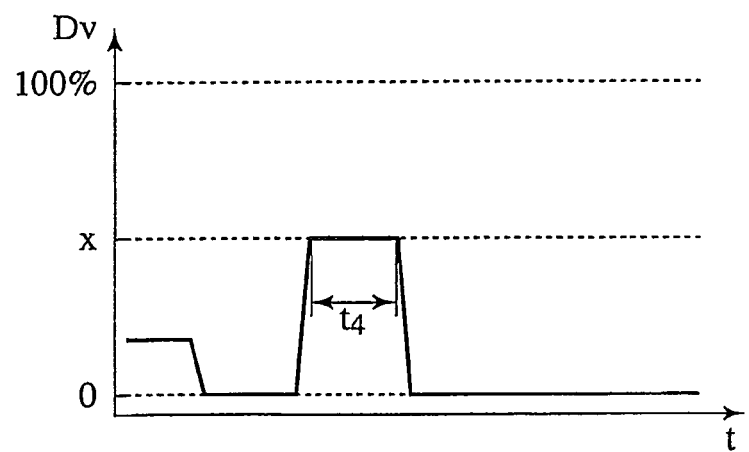
Figure 6C:
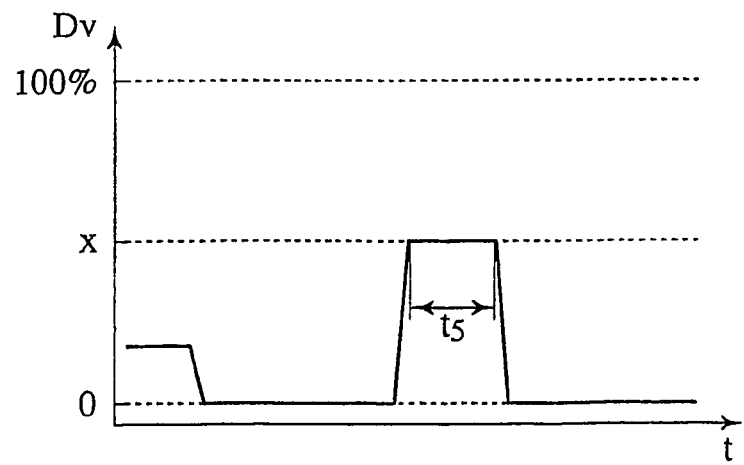

Further, with the structure shown in FIG. 1 where the plural air flow rate control systems are disposed in parallel to one another like the flow control valves 8, 9, 10, the flow control valves 8, 9, 10 may be preferably opened to have the droplet removal openings X for time intervals $t_3$, $t_4$, $t_5$ in sequence to cause a particular flow control valve of the object for removal of the droplets to be effectuated as shown by the timing charts shown in FIGS. 6A to 6C, respectively, while rendering the other remaining flow control valves inoperative (i.e., fully closed) during the time interval in which the particular flow control valve is opened for the removal of the droplets for thereby enabling the pressure of air to be supplied to the particular flow control valve to be increased. More particularly, as shown in FIG. 6A, first, the flow control valve 8 is opened at the droplet removal opening degree X for the time interval $t_3$ and at the same time, as shown in FIGS. 6B and 6C, other remaining flow control valves 9, 10 are fully closed. Subsequently, as shown in FIG. 6B, the flow control valve 9 is opened at the droplet removal opening degree X for the time interval $t_4$ and at the same time, as shown in FIGS. 6A and 6C, other remaining flow control valves 8, 10 are fully closed. Consecutively, as shown in FIG. 6C, the flow control valve 10 is opened at the droplet removal opening degree X for the time interval $t_5$ and at the same time, as shown in FIGS. 6A and 6B, other remaining flow control valves 8, 9 are fully closed.

Also, in a case where a plurality of flow paths in which the flow control valves are connected in series are disposed in parallel to one another, one of the parallel flow paths is selected as an object for removal of the droplets while the other flow paths are fully closed, and the flow control valves are opened at the droplet removal opening degree X to remove the droplets in sequence in which the flow control valves are closer to the compressor 3 serving as the droplet removal air supply mechanism in the flow path for the object to remove the droplets whereupon subsequently, the remaining other flow path of the plural flow paths may be similarly rendered operative to execute removal of the droplets.

Figure 7:
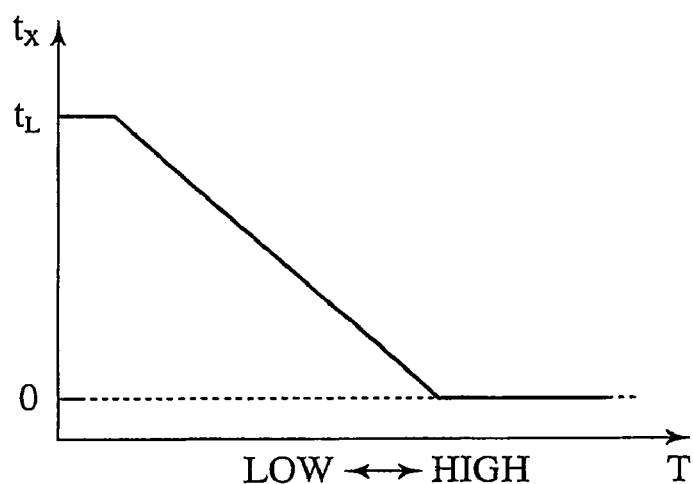
FIG. 7 is a graphical representation of a relationship between a surrounding temperature T of the air flow rate control systems and a time interval $t_X$ for which a droplet removal opening degree is kept in the fuel cell system of the first embodiment.

Further, locating a detector, which detects the temperature T within the fuel cell system, in the vicinity of the air flow rate control systems involving the flow control valves 8, 9, 10 and the pressure control valves 13, 14 enables control such that as shown in FIG. 7, the lower the temperature T, the longer will be the time interval $t_X$ for which the control valve is retained at the droplet removal opening degree X. Supposing that the temperature within the fuel cell system to be used in such a case is the temperature subsequent to the start-up delay time elapsed after the halt of the fuel cell system in the first droplet removal start-up condition set forth above, it is conceived that the dew condensation occurs and the amount of dew condensation increases. Therefore, in order to reliably remove the droplets in the case where there is an increased amount of moisture due to the dew condensation, a time interval in which the droplet removal opening degree necessary for removal of the droplets is retained is determined to have a prolonged value. Also, in the figure, $t_L$ designates the maximum value of the time interval in which the droplet removal opening degree X is retained and $t_S$ designates the minimum value of the time interval in which the droplet removal opening degree X is retained.

Figure 8:
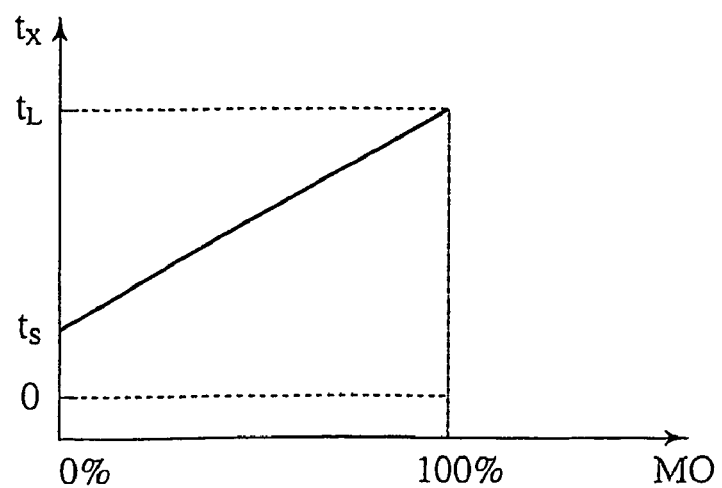
FIG. 8 is a graphical representation of a relationship between a surrounding humidity MO of the air flow rate control systems and the time interval $t_x$ for which the droplet removal opening degree is kept in the fuel cell system of the first embodiment.

Further, locating a detector, which detects the humidity MO within the fuel cell system, in the vicinity of the air flow rate control systems involving the flow control valves 8, 9, 10 and the pressure control valves 13, 14 enables control such that as typically shown in FIG. 8, the higher the humidity within the fuel cell system, the longer will be the time interval $t_X$ for which the control valve is retained at the droplet removal opening degree X. When applied to the second droplet removal start-up condition set forth above, it is determined such that the higher the humidity appearing directly after the stop of the fuel cell system, the longer will be the time interval $t_X$ in which the control valve is retained at the droplet removal opening degree X, thereby enabling removal of the droplets to be reliably executed in the situation where there is an increased amount of moisture due to the dew condensation. Also, in the figure, $t_L$ designates the maximum value of the time interval in which the droplet removal opening degree X is retained and $t_S$ designates the minimum value of the time interval in which the droplet removal opening degree X is retained.

Figure 9:
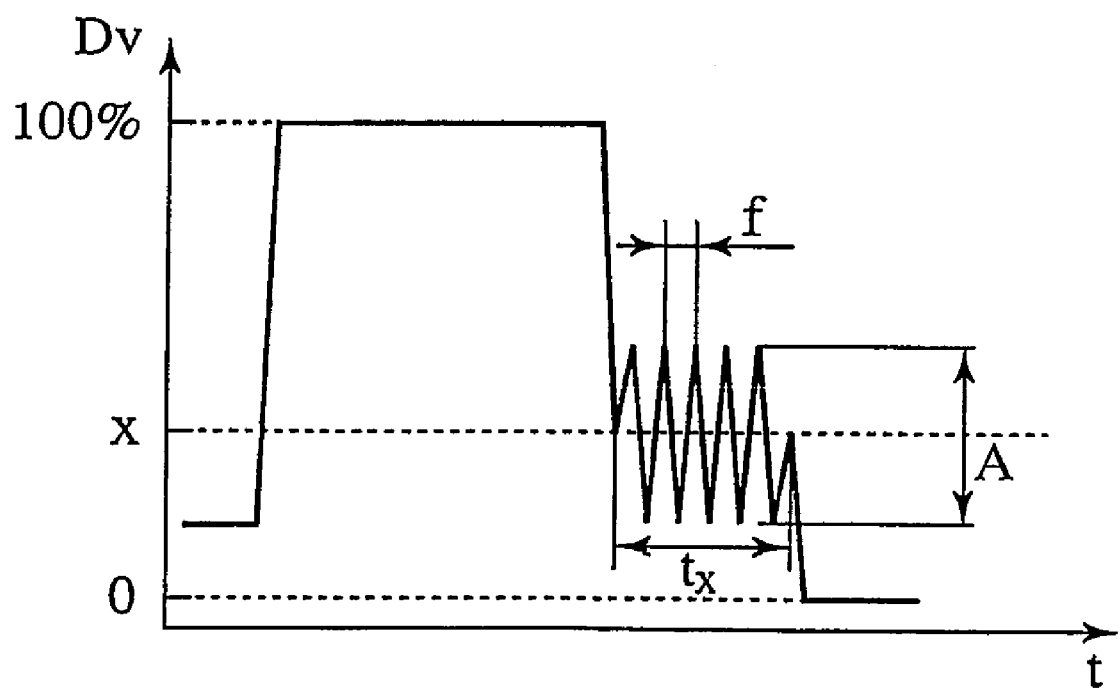
FIG. 9 shows a timing chart for executing the operations when periodically varying the droplet removal opening degree in the fuel cell system of the first embodiment.

Furthermore, as typically shown in FIG. 9, an alternative approach may be undertaken to periodically vary an amplitude A and a frequency f of the droplet removal opening degree X to be achieved in the droplet removal opening degree $D_V$ of each of the flow control valves 8, 9, 10 and the pressure control valves 13, 14 of the respective air flow rate control systems. Thus, by periodically varying the amplitude A and the frequency f of the droplet removal opening degree X, it is possible to more effectively remove the droplets that would be hardly removed in a flow of air in a stationary state.

Also, another approach may be undertaken for the flow direction control valve 17 such that under a closed condition, the flow direction control valve 17 is supplied with air from the compressor 3 serving as the droplet removal air supply mechanism to temporarily accumulate air therein and subsequently opened to execute removal of the droplet in a further effective manner.

Moreover, although there is a need for the electrolyte layer inside the fuel cell body 12 to contain the moisture, there is a probability in which an insufficient amount of moisture appears due to an adverse effect of dry air to be used for removal of the droplets. To address this issue, an approach may be undertaken to provide a structure in which a water feed system, which is not shown, is activated after the droplet removal operation has been terminated to cause moisture to be supplied to the inner area of the fuel cell body 12. Alternatively, a bypass system may be conceivably provided to preclude dry air from passing through the fuel cell body 12, and the bypass system is rendered opened during removal operation for the droplets.

After removing the droplets in the steps previously mentioned, in step S8, all the control valves, such as the flow control valves 8, 9, 10 and the pressure control valves 13, 14, are fully closed to complete a series of sequential operations.

Summarizing the above, the presently filed embodiment of the invention is based on a consideration in that when the electric power generation of the fuel cell system is stopped, if the flow control valves 8, 9, 10 and the pressure control valves 13, 14 are closed under the condition where the interior of the system remains at the high temperature, there is an increased probability in which the dew condensation occurs after the system has been cooled and under the condition where the system is kept under a low temperature circumstance equal to or below 0° C., the flow control valves 8, 9, 10 and the pressure control valves 13, 14 are suffered from freezing and sticking to cause an increased time interval to be required for removing the freezing of the flow control valve with high temperature air supplied from the compressor 3 at a subsequent start-up operation and to cause a resultant longer time period to be required for start-up of the system. To address such an issue, the droplets in the flow control valves 8, 9, 10 and the pressure control valves 13, 14 are blown off using the air from the compressor 3, serving as the droplet removal air supply mechanism, at the stop of or after the stop of the electric power generation, resulting in no probability in dew condensation and freezing of the droplets to enable the start-up time period to be shortened.

Second Embodiment

Next, a second embodiment of the invention is described below more in detail mainly with reference to FIG. 10. A fuel cell system of the presently filed embodiment has a structure in which the reformer of the first embodiment is replaced with a hydrogen cylinder. Accordingly, the presently filed embodiment is described with a point of view in mind to such a difference, with like parts bearing the same reference numerals as those of the first embodiment to suitably omit redundant description or to be explained in a brief manner.

Figure 10:
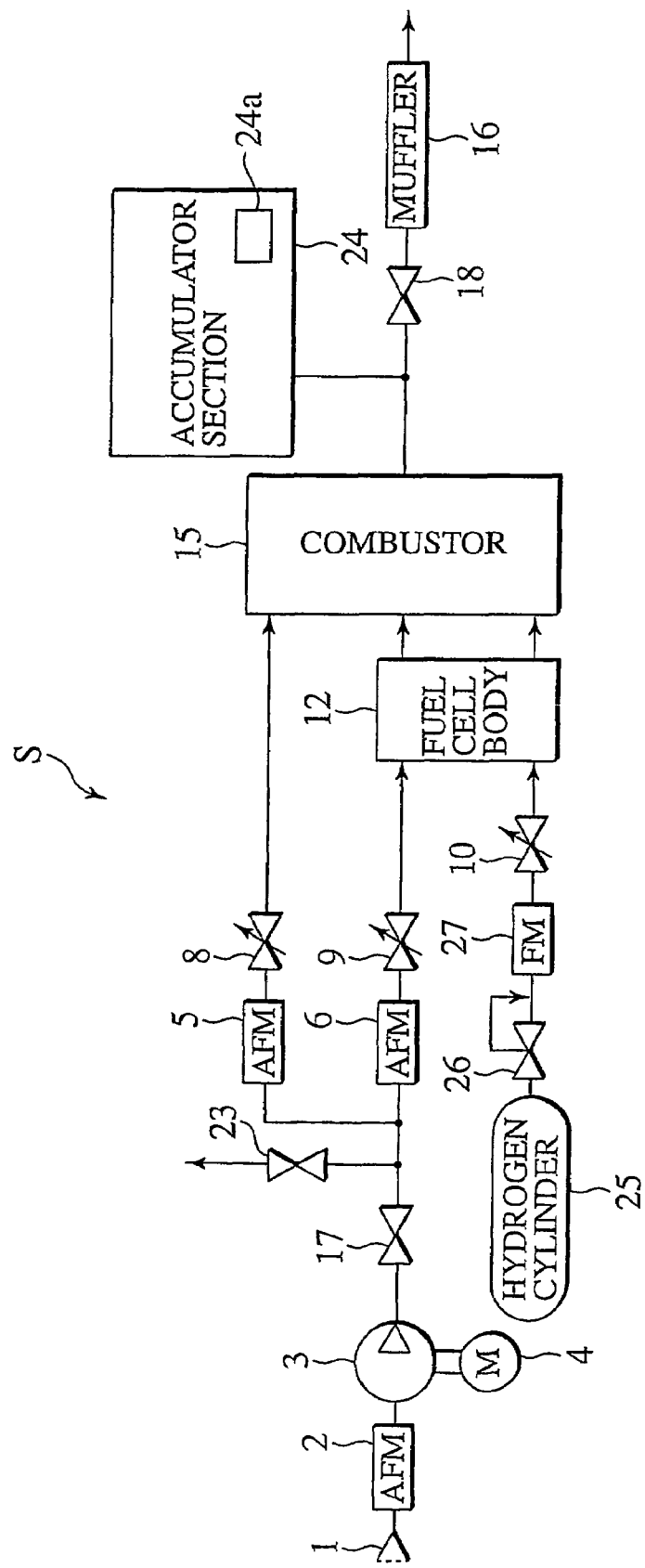
FIG. 10 is a system structural view of a fuel cell system of a second embodiment according to the present invention.

FIG. 10 is a system overall structure of the fuel cell system of the presently filed embodiment.

As shown in FIG. 10, with the fuel cell system of the presently filed embodiment, a hydrogen cylinder 25 that serves as a hydrogen storage section is provided in place of the reformer 11 of the first embodiment, eliminating the need for the reformer 11 to enable the system to be manufactured in a simplified structure.

Further, the fuel cell system also includes the compressor 3, the fuel cell body 12 and the combustor 15 like in the first embodiment, and an air flow rate control systems include two combinations, i.e., a combination between an air flow meter 5 and a flow control valve 8 and a combination between an air flow meter 6 and a flow control valve 9. Furthermore, a hydrogen flow rate control system includes a pressure reduction valve 26, a flow meter 27 and a flow control valve 10 through which hydrogen gas is controlled at a desired flow rate and supplied to a fuel electrode of the fuel cell body 12.

Moreover, in FIG. 10, reference numeral 23 designates a flow direction control valve and reference numeral 24 designates an accumulator section disposed in downstream of the combustor 15 to accumulate exhaust air emitted from the combustor 15, with the flow direction control valve 23 and the accumulator section 24 being combined in a reverse flow mechanism. Also, such an accumulator section 24 is configured to function as a droplet removal air supply mechanism.

Now, the operation of the fuel cell system of the presently filed embodiment is described below.

The fuel cell system of the presently filed embodiment performs the same operations, in accordance with step S1, in which a sequence of electric power generation is stopped, and its several subsequent steps, i.e., step S2 to step S6, in the same manner as the first embodiment, as shown in FIG. 2.

However, the presently filed embodiment is different from the first embodiment in that operations subsequent to step S6 are executed to operate the flow control valves 8, 9 that form objects for removal of the droplets and a method of allowing dry air, whose droplets are removed, to be introduced into the fuel cell system in step S7 is modified such that the air is accumulated in the accumulator section 24, forming a part of the reversed flow mechanism, once and then, the flow direction valve 23, also forming a part of the reversed flow mechanism, is opened to allow the reverse flow of the air to be utilized for removal of the droplets.

After the droplets has been removed in the steps set forth above, in step S8, all the control valves such as the flow control valves 8, 9 are closed to terminate a series of operations.

Also, the accumulator section 24 may be provided with a hygroscopic material 24a such as silica gel or quicklime to allow a further dry air to be stored and subsequently air is flow in a reversed direction.

Summarizing the above, also, the presently filed embodiment of the invention is based on a consideration in that when the electric power generation of the fuel cell system is stopped, if the flow control valves 8, 9 are closed under the condition where the interior of the system remains at the high temperature, there is an increased probability in which the dew condensation occurs after the system has been cooled and under the condition where the system is kept under a low temperature circumstance equal to or below 0° C., the flow control valves 8, 9 are suffered from freezing and sticking to cause an increased time interval to be required for removing the freezing of the flow control valve with high temperature air supplied from the compressor 3 at a subsequent start-up operation and to cause a resultant longer time period to be required for start-up of the system. To address such an issue, the droplets in the flow control valves 8, 9 are blown off using air flowing from the accumulator section 24, serving as the droplet removal air supply mechanism, in a reverse direction at the halt of or after the halt of the electric power generation, resulting in no probability in dew condensation and freezing of the droplets to enable the start-up time period to be shortened.

Also, in the embodiments previously mentioned, the first embodiment having the system incorporating the reformer shown in FIG. 1 may be modified so as to include the reverse flow mechanism of the second embodiment, wherein the system employs the hydrogen cylinder shown in FIG. 10, in place of the moisture absorbing mechanism and, alternatively, the second embodiment shown in FIG. 10 may be modified so as to include the moisture absorbing mechanism of the first embodiment shown in FIG. 1.

The entire content of a Patent Application No. TOKUGAN 2002-1570 with a filing date of Jan. 8, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

INDUSTRIAL APPLICABILITY

As set forth above, according to the invention, it is structured that the openings of the air flow rate control components are set at the droplet removal opening degree for speeding up the flow speed of air to allow the air to be flown at the droplet removal opening degree for thereby causing the droplets adhered to the air flow rate control components to be blown off whereby the freezing and sticking of the air flow rate control components are avoided to enable the system to be started up in the shortest time period. Accordingly, the present invention is expected to have a wide application range including a fuel cell powered automobile in which such a fuel cell system is adopted or the like.

The invention claimed is:

1. A fuel cell system comprising:
a fuel cell body;
an air supply system supplying air to the fuel cell body;
an air flow rate control system controlling a flow rate of the air and being arranged in a flow path through which the air is supplied, an opening degree of the flow path being variable to control a flow rate of the air; and
a droplet removal structure that includes the air flow rate control system with a controller and a control valve for removing droplets adhered to the air flow rate control system, the controller being configured to control an opening degree of the control valve to be at a droplet removal opening degree, smaller than a fully opening degree, to increase a speed with which the air flows for a variable time interval determined in dependence upon at least one of detected conditions of a temperature of an atmospheric air outside the fuel cell system and a humidity inside the fuel cell system, when a given condition is established at a stop of or after the stop of the fuel cell system, and to allow the air to flow at the droplet removal opening degree to cause the droplets adhered to the air flow rate control system to be blown off.

2. The fuel cell system according to claim 1, further comprising:
a reformer reforming feed material to produce reformed gas to be supplied to the fuel cell body, the reformed gas being supplied to the fuel cell body; and
a combustor receiving exhaust gases emitted from the fuel cell body and the air delivered from the air supply system to be combusted,
wherein the air flow rate control system is controllable to vary an opening degree of each of flow paths leading from the air flow rate control system to the reformer, the fuel cell body and the combustor, respectively, to control the flow rate of the air, and the droplet removal structure is operative to set the opening degree of the air flow rate control system at the droplet removal opening degree, when the given condition is established at the stop of or after the stop of the fuel cell system under a condition in which a temperature of the fuel cell system is lowered, to allow the air to flow at the droplet removal opening degree to cause the droplets adhered to the air flow rate control system to be blown off.

3. The fuel cell system according to claim 1, further comprising:
a hydrogen storage section storing hydrogen gas to be supplied to the fuel cell body; and
a combustor receiving exhaust gases emitted from the fuel cell body and the air delivered from the air supply system to be combusted,
wherein the air flow rate control system is controllable to vary an opening degree of each of flow paths leading from the air flow rate control system to the fuel cell body and the combustor, respectively, to control the flow rate of the air, and the droplet removal structure is operative to set the opening degree of the air flow rate control system at the droplet removal opening degree, when the given condition is established at the stop of or after the stop of the fuel cell system under a condition in which a temperature of the fuel cell system is lowered, to allow the air to flow at the droplet removal opening degree to cause the droplets adhered to the air flow rate control system to be blown off.

4. The fuel cell system according to claim 1, wherein the given condition corresponds to a situation in which an atmospheric temperature of the fuel cell system is equal to or below a given temperature at the stop of or after the stop of the fuel cell system.

5. The fuel cell system according to claim 1, wherein the given condition corresponds to a situation in which a humidity in the fuel cell system is substantially equal to a given humidity at the stop of or after the stop of the fuel cell system.

6. The fuel cell system according to claim 1, wherein the given condition corresponds to a situation in which a difference between an atmospheric temperature of the fuel cell system and a temperature in the fuel cell system is equal to or below a given temperature difference at the stop of or after the stop of the fuel cell system.

7. The fuel cell system according to claim 1, wherein the given condition corresponds to a situation in which an amount of moisture, by which the air flow rate control system is frozen, is equal to or more than an amount of moisture, which is removable by use of a driving force of the air flow rate control system, at the stop of or after the halt of the fuel cell system.

8. The fuel cell system according to claim 1, wherein the droplet removal structure blows off the droplets adhered to the air flow rate control system using dry air whose moisture is removed by a moisture absorbing mechanism.

9. The fuel cell system according to claim 8, wherein the moisture absorbing mechanism includes a hygroscopic material which is regenerative by exhausting moisture, heated with a heat of a combustor and accumulated therein, at a start-up of the fuel cell system.

10. The fuel cell system according to claim 8, wherein a weight of the moisture absorbing mechanism is detected and, when the weight is equal to or below a given value, information is made that the moisture absorbing mechanism is to be replaced.

11. The fuel cell system according to claim 1, further comprising:
an accumulator section accumulating air to be used for removing the droplets,
wherein the accumulator section is operative to accumulate the air to be supplied to the air supply system and, subsequently, the air is caused to flow toward an upstream of the fuel cell system in a reverse direction.

12. The fuel cell system according to claim 11, wherein the accumulator section has a moisture absorbing material that removes moisture from the air accumulated in the accumulator section.

13. The fuel cell system according to claim 1, further comprising:
a droplet removal air supply section operative to pressurize the air supplied from the air supply system for removing the droplets,
wherein a plurality of air flow rate control systems are disposed in series and each of the plurality of air flow rate control systems is configured to be opened at the droplet removal opening degree, in sequence in which the plurality of air flow rate control systems are closer to the droplet removal air supply section, while fully opening the other of the plurality of air flow rate control systems.

14. The fuel cell system according to claim 1, wherein a plurality of air flow rate control systems are disposed in parallel to one another and one of the plurality of air flow rate control systems with droplets to be removed is opened at the droplet removal opening degree while fully closing the other of the plurality of air flow rate control systems.

15. The fuel cell system according to claim 14, further comprising:
a droplet removal air supply section operative to pressurize the air supplied from the air supply system for removing the droplets,
wherein it is configured such that the larger the distance from the droplet removal air supply section, the longer will be the time interval in which when the droplets are removed, the droplet removal opening degree of each of the plurality of air flow rate control systems is kept.

16. The fuel cell system according to claim 1, wherein a time interval in which the air flow rate control system is kept at the droplet removal opening degree is varied in accordance with surrounding conditions of the air flow rate control system.

17. The fuel cell system according to claim 16, wherein a time interval in which the air flow rate control system is kept at the droplet removal opening degree is varied in accordance with a temperature in the fuel cell system.

18. The fuel cell system according to claim 16, wherein a time interval in which the air flow rate control system is kept at the droplet removal opening degree is varied in accordance with a humidity of the fuel cell system.

19. The fuel cell system according to claim 1, wherein the droplet removal opening degree is periodically varied.

20. A fuel cell system comprising:
a fuel cell body;
air supply means for supplying air to the fuel cell body;
air flow rate control means for controlling a flow rate of the air, while being arranged in a flow path through which the air is supplied, an opening degree of the flow path being variable to control a flow rate of the air; and
droplet removal means for removing droplets adhered to the air flow rate control means, the droplet removal means including the air flow rate control means and a controller, the controller being configured to control an opening degree of the air flow rate control means to be at a droplet removal opening degree, smaller than a fully opening degree, to increase a speed with which the air flows for a variable time interval determined in dependence upon at least one of detected conditions of a temperature of an atmospheric air outside the fuel cell system and a humidity inside the fuel cell system, when a given condition is established at a stop of or after the stop of the fuel cell system, and to allow the air to flow at the droplet removal opening degree to cause the droplets adhered to the air flow rate control means to be blown off.

* * * * *